United States Patent Office 3,326,886
Patented June 20, 1967

3,326,886
WATER SOLUBLE DERIVATIVES OF P-AMINO-SALICYCLIC ACID
Kiyoshi Kominato, 15 Shimogamo-Hagigakakiuchicho, Sakyoku, Kyoto, Japan
No Drawing. Filed June 10, 1965, Ser. No. 463,046
Claims priority, application Japan, Mar. 6, 1961, 36/7,026
2 Claims. (Cl. 260—112.5)

This application is a continuation-in-part of my copending application Ser. No. 176,897, filed Mar. 2, 1962, and now abandoned.

The present invention relates to a new compound, namely p-amino-salicyl-glutamyl-homocystinyl-thiamamidine (creatinyl-4-methyl-5-ethoxy-thiazole) hereinafter referred to as P.S.C.) and the pharmacologically acceptable water soluble salts thereof.

The object of this invention is to provide a new water soluble therapeutic for the treatment of tuberculosis which is derived from an insoluble therapeutic for tuberculosis, so called PAS and which does not have an adverse effect on the alimentary tract and which can be used for hypodermic and intravenous injections.

According to the present invention a process is provided which comprises subjecting ground decoated garlic of the genus *Allium scordinine* to the action of its own enzymes to give a degradation product hereinafter referred to as scormine, converting said scormine to its acid halide and reacting said acid halide with p-aminosalicylic acid (PAS) or the alkali metal or alkaline earth metal salts thereof to give a new compound p-amino-salicyl-glutamyl-homocystinyl-thiamamidine (creatinyl-4-methyl-5-ethoxy-thiazole). According to the process of this invention, the hitherto known water insoluble therapeutic for tuberculosis identified as PAS may be made water soluble by introduction of a derivative of the genus Allium and therefore effective concentration thereof in the blood may be maintained by a small amount of effective group of PAS.

The P.S.C. of the present invention is light yellowish brown in color, M.P. 137°–139° C. P.S.C. is an acidic compound, soluble in water and easily soluble in ethanol or methanol. The aqueous solution of the new compound is colored to a reddish violet by the addition of aqueous iron chloride solution. The salts thereof such as the sodium salt are colored to purplish red by addition of an alcohol ninhydrin solution under heating. Further, if the new compound is boiled with 6 N hydrochloric acid, neutralized, and thereafter is made strongly alkaline by adding sodium nitroprusside, the solution shows a reddish brown color and then reverts to the original state on standing. If the aqueous solution is first made acidic with glacial acetic acid, it shows a bluish green color which will be changed to berlin blue by boiling. Through the addition of Preburda's diazo reagent, P.S.C. exhibits a diazo reaction and becomes purplish red in color. Further, if P.S.C. is melted together with concentrated caustic alkali, ammonia gas is evolved and the addition of aqueous lead acetate solution yields a black precipitate. The aqueous solution of the new compound is positive in Sakaguchi's reaction.

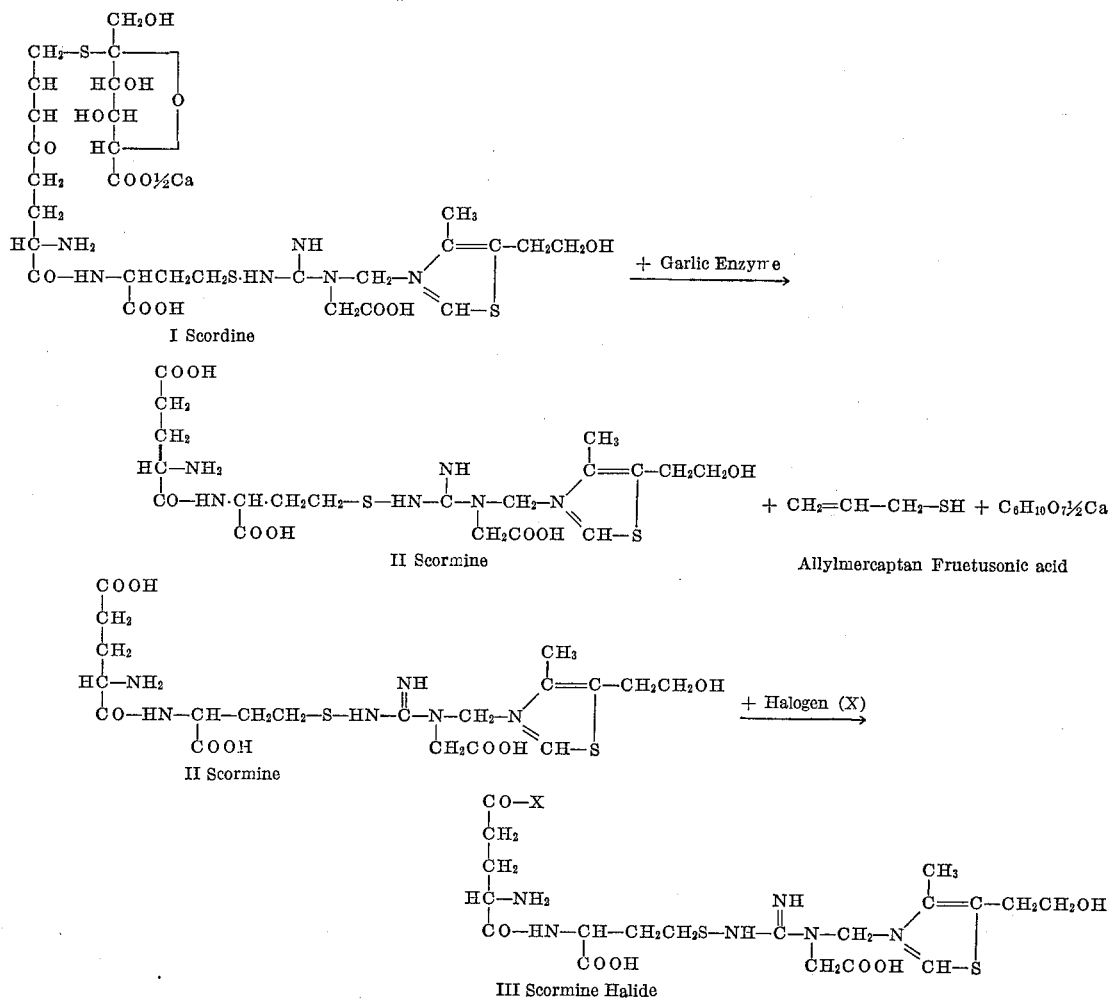

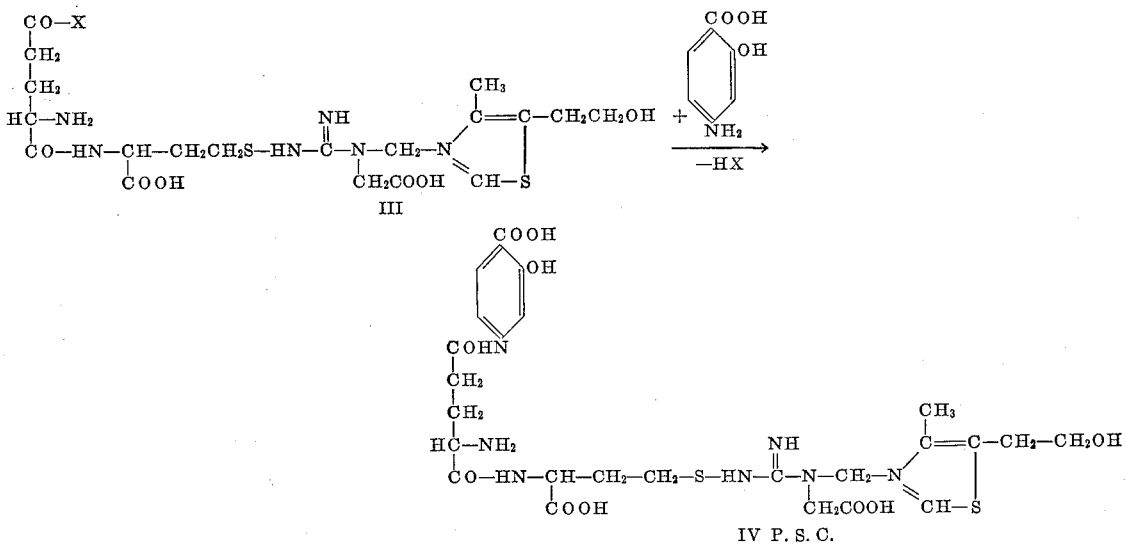

ELEMENTAL ANALYSIS OF P.S.C.

[Carbon: Theoretical value, 47.92%]

| Number of Test | Sample (mg.) | $CO_2$ (mg.) | C Percent |
|---|---|---|---|
| 1 | 3.859 | 6.764 | 47.83 |
| 2 | 3.576 | 6.277 | 47.90 |
| Average | | | 47.87 |

[Hydrogen: Theoretical value, 5.37%]

| Number of Test | Sample (mg.) | $H_2O$ (mg.) | H Percent |
|---|---|---|---|
| 1 | 3.859 | 1.831 | 5.31 |
| 2 | 3.576 | 1.743 | 5.45 |
| Average | | | 5.38 |

[Nitrogen: Theoretical value, 14.62%]

| Number of Test | Sample (mg.) | Nitrogen (ml.) | Temperature (° C.) | Pressure (mm. Hg) | N Percent |
|---|---|---|---|---|---|
| 1 | 4.115 | 0.497 | 11 | 756 | 14.44 |
| 2 | 4.053 | 0.498 | 11.5 | 756 | 14.65 |
| Average | | | | | 14.55 |

[Sulfur: Theoretical value, 9.56%]

| Number of Test | Sample (mg.) | $SO_4$ (mg.) | S Percent |
|---|---|---|---|
| 1 | 3.503 | 9.963 | 9.49 |
| 2 | 4.165 | 11.919 | 9.55 |
| Average | | | 9.52 |

The new compound P.S.C. is soluble in water and characterized in that a small amount thereof can maintain an effective concentration in blood for long period of time, and therefore it has no adverse effect on the stomach or bowels which is a side effect of PAS, and at the same time it is effective for producing an increase in physical strength due to the oxidation-reduction action of the active constituents of the garlic. As the new compound is water-soluble, it may be utilized for hypodermic, intravenous injection and the like.

Scormine (compound II) to be used in this invention as the starting material is preferably prepared as follows:

Decoated raw garlic cloves are ground and matured for 1–2 days at 30–36° C. by the enzyme contained therein. The enzymically matured material is subjected to a steam distillation at about 130° C. to eliminate the volatile constituents.

The water-soluble residue resulting from the steam distillation is treated with active carbon which is then eluted with 90–96% methanol. To the eluate 10–15% of absolute alcohol are added. The impurities which are precipitated are filtered out. The filtrate is concentrated to about ⅕ volume. The concentrate is poured into a vessel which is ice-cooled. The crude crystals deposited are dissolved in water or methanol and the solution bleached with active carbon. The bleached solution is again concentrated and permitted to stand in an ice-room for one or two weeks to give pure scormine crystals.

The present invention is illustrated by the following examples.

Example I 55.3 g. (0.1 mol) of crystalline scormine (compound II) which was prepared as described above, is placed in 250 ml. of glacial acetic acid and heated to dissolve. To the solution 28.5 g. (0.25 mol) of thionyl chloride was added dropwise accompanied by cooling and stirring for 30 minutes. The reaction was accompanied by violent evolution of hydrochloric acid gas and sulfurous acid gas. After completion of the addition of thionyl chloride, the reaction mixture was warmed at about 45° C. for about one hour to complete the reaction. The reaction mixture of deep reddish brown color was connected to a water current aspirator to expel sulfurous acid gas under cooling as completely as possible. The reaction mixture was concentrated under reduced pressure at about 45° C. to evaporate and remove hydrochloric acid gas and sulfurous acid gas as completely as possible. To the syrup thus obtained, there was added a proper amount of methanol and the mixture was distilled at a lower temperature under reduced pressure. By two or three successive distillations acetic acid was expelled from the mixture as methyl acetate. The concentrate was permitted to stand in an ice-room overnight to give crystals of scormine chloride. Yield was 88–95% of theoretical amount.

Example II 56.2 g. (0.1 mol) of scormine chloride crystals (compound III) were dissolved in 250 g. of warm glacial acetic acid. To this solution about 40 g. (0.2 mol) of PAS-calcium (double salt of calcium hydroxide of PAS-calcium) were added slowly with cooling and stirring whereby PAS-calcium was slowly dissolved. The mixture was heated for one hour at 50° C. while stirring and then filtered. Residual unreacted PAS-calcium was washed with methanol. The solution resulting from the washing was combined with the reaction solution. From this combined solution methanol was distilled off to give reddish brown crude crystals of P.S.C. Recrystallization from 60% aqueous methanol gave pure P.S.C. Yield 82–85%. M.P. 137°–139° C.

*Example III*

The procedure of Example II is followed using PAS-sodium instead of PAS-calcium. The product consists of crude crystals of P.S.C. which recrystallized from 60% aqueous ethanol.

*Example IV*

10 g. of crystalline P.S.C. is dissolved in water and the resulting solution is neutralized with 0.1 N sodium hydroxide solution. The neutralized solution is then lyophilized under high vacuum. The residual powder represents the pure sodium salt of p-amino-salicyl-glutamyl-homocystinyl - thiamamidine - (creatinyl - 4-methyl-5-ethoxy-thiazole).

While I have shown and described what I believe to be the best embodiments of my invention, it will be apparent to those skilled in the art that various changes and modifications may be made therein without departing from the spirit and scope of the invention as defined in the appended claims.

What is claimed is:
1. p - Amino - salicyl-glutamyl-homocystine-thiamamidine-(creatinyl-4-methyl-5-ethoxy-thiazole).
2. A pharmacologically acceptable water-soluble salt of the compound of claim 1.

References Cited

FOREIGN PATENTS

35/2,398    3/1960    Japan.

OTHER REFERENCES

Hickinbottom: Reactions of Organic Compounds, 1948, page 249.

Sidgwick: Organic Chemistry of Nitrogen, 1937, pages 138–9.

ALEX MAZEL, *Primary Examiner.*

RICHARD J. GALLAGHER, *Assistant Examiner.*